Sept. 21, 1937.   W. V. MOAK ET AL   2,093,816
ELECTRIC BOND FOR RAIL JOINTS
Filed June 11, 1936

INVENTOR.
WILLIAM V. MOAK
BY JASPER T. HAMBLIN
Kwis, Hudson & Kent
ATTORNEYS.

Patented Sept. 21, 1937

2,093,816

UNITED STATES PATENT OFFICE 2,093,816

ELECTRIC BOND FOR RAIL JOINTS

William V. Moak, Springfield, and Jasper Thomas Hamblin, La Rue, Ohio

Application June 11, 1936, Serial No. 84,720

1 Claim. (Cl. 173—279)

This invention relates to improvements in devices for making electric bonds in the joints between railroad rails, and has for its object the provision of a comparatively inexpensive device that will form an efficient bond and give dependable service over long periods of time.

A further object of the invention is to provide a simple device, for the purposes stated, that will not require the services of skilled workmen for its application and that may be readily installed by the ordinary laborers that are employed on railroads for the purpose of maintaining the trackage.

A further object of the invention is to provide a device of the kind specified that will be housed in the space between the fish plate and the rail and thus protected from damage by malicious or mischievous persons or by objects falling from trains.

A further object of the invention is to provide a device for the purposes specified in which the fish plate will be utilized as a conductor for conveying an electric current from one rail to the next, thereby avoiding the use of special conductors for that purpose.

A further object of the invention is to provide a more efficient rail bonding device than those heretofore used, through utilizing the fish plate as a part of the circuit so that a break in the circuit may serve as an indication of a broken fish plate as well as a broken rail.

Other objects of the invention and the features of novelty will be apparent from the following description taken in connection with the accompanying drawing, in which Fig. 1 is a side elevation of a rail joint embodying our invention;

Figure 2:
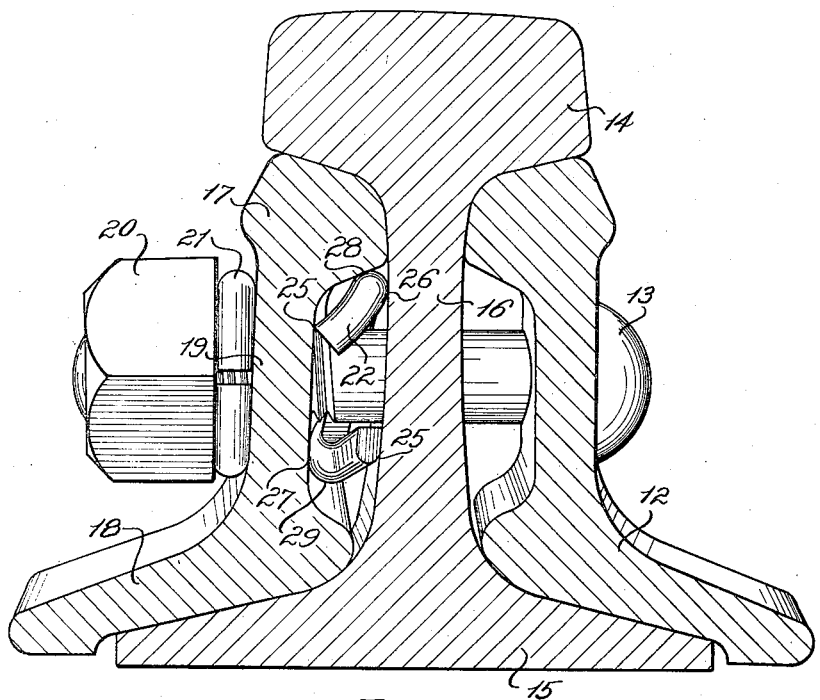
Fig. 2 is an enlarged transverse section on the line 2—2 of Fig. 1, with some of the parts shown in perspective.

Referring to the drawing, 10 and 11 indicate the ends of two rails which are connected together by the fish plates 12 and bolts 13, in accordance with common practice in modern rail construction. Each of the rails has a head 14, a foot flange 15 and a web 16 connecting the head and the foot flange. Each of the fish plates has a portion 17 which fits the angle between the head 14 and the web 16, and a flange 18 which bears upon the upper surface of the foot flange 15. A web 19 arranged substantially parallel with the web 16, but spaced therefrom, as shown in Fig. 2, connects the portions 17 and 18 of the fish plate. Each of the bolts 13 has a nut 20 thereon and a lock washer 21 between the nut and the other side of the web 19, in accordance with the common practice.

Figure 1:
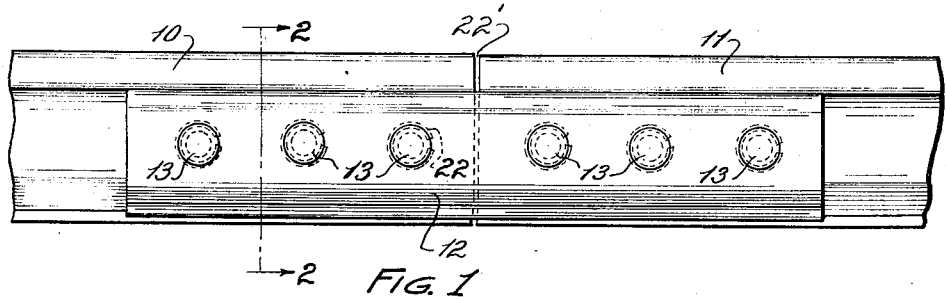

As shown in Fig. 1, the fish plates 12 bridge the joint 22' between the ends of the rails 10 and 11 and, in accordance with our invention, we utilize one of these fish plates, at each rail joint, as an electric conductor for carrying current from one of the rails to the other. In various forms of signal apparatus used on railroads it is customary to utilize one or both of the rails of a track as part of the electrical circuit for controlling the signals and it is, therefore, necessary to have an efficient bonding device between the ends of adjoining rails. The mere contact of the fish plate with the rail surfaces does not afford a satisfactory electrical connection because of the scale on the surfaces, the accumulation of rust, and the presence of other substances that would act more or less as insulators between the abutting surfaces and, therefore, form an interruption in the electrical circuit.

Figures 3, 4:
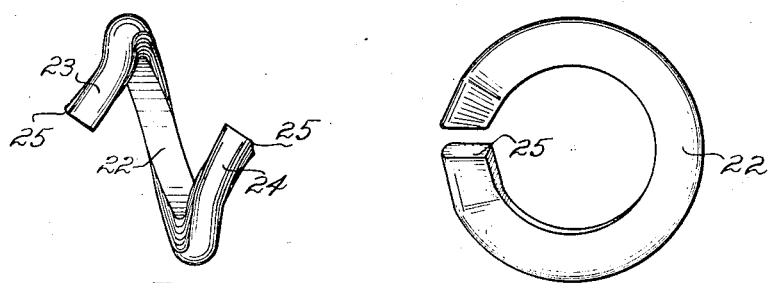
Fig. 3 is a view of one of the springs made in accordance with our invention.
Fig. 4 is a side elevation thereof.

In accordance with our invention we employ a specially constructed helical spring in the space between the web 19 of the fish plate and the web 16 of the rail and, in Fig. 2, we have shown one of these springs, which is indicated generally by the numeral 22. One of these springs is shown in its free condition, in Figs. 3 and 4, and, from these figures, it will be seen that the spring consists of substantially a single convolution of a helix made from comparatively heavy wire stock with the end portions 23 and 24 bent in the axial direction so as to have a greater pitch than the body of the spring and to provide prominent cutting edges 25 which are adapted to gouge into the web of the fish plate and the web of the rail when the spring is installed as shown in Fig. 2. The size of the wire stock is indicated in the drawing in relation to the dimensions of the parts with which the spring 22 is associated and, in order to insure adequate tension in the spring, it will be noted that its free length is several times the thickness of the stock and preferably not less than three times, although this free length will, of course, be dependent upon the size of the space between the fish plate and the web of the rail. As shown in this figure, the spring 22 also bears against the web 16 of the rail at the point 26 and against the web of the fish plate at the point 27, the points 26 and 27 being on diametrally opposite sides of the spring.

As many of the springs 22 may be used in each joint as may be preferred, but at least one of them should be used in connection with a bolt 13 going through each rail. In installing the spring 22 the parts are loosely assembled in the relation shown in Fig. 2, and the nuts 20 are tightened to draw the fish plates tightly against the rail and, in so doing, the springs 22 are axially compressed and the cutting edges 25 are caused to gouge into the web 19 of the fish plate and the web 16 of the rail, thereby making a good contact so that the current from the rail will pass through the spring and into the fish plate and thence along the fish plate and through another of the springs 22 into the adjoining rail.

From the foregoing description it will be noted that each of the springs 22 contacts with the web of the rail at two points and with the web of the fish plate at two points. The springs 22 may be of such diameter that they will engage the fish plate at the points 28 and 29 so as to be confined against radial expansion and positively held against movement in any direction, although it is not essential to have the springs engage with the fish plate at the points 28 and 29 and the engagement should not be such that it would prevent the fish plate from being drawn up to its proper position in relation to the rail. It will be seen further that we provide for a plurality of points of contact between the spring and rail and between the spring and the fish plate which insures good electrical conduction and, by reason of the spring being confined by the shoulders of the fish plate, these points of contact are maintained.

On account of the springs being housed between the fish plate and the web of the rail, as shown in Fig. 2, it is evident that they are thoroughly protected and concealed and not subject to being damaged by objects falling from rolling stock or subject to corrosion by brine or other liquid materials which might drip onto the rails. The springs are also protected from damage by malicious or mischievous persons.

In addition to the foregoing advantages of our bonding device, it has the further advantage that it will serve as an indication of a broken fish plate as well as a broken rail in case of an interruption in the circuit. In bonding devices heretofore used, the ends of the rails are connected together by a separate conductor so that the current does not pass through the fish plate and, therefore, there would be no interruption of the circuit in the case of a broken fish plate.

While we have illustrated and described a preferred form of our invention, it will be apparent to those skilled in the art that changes may be made in the cross section of the spring stock and in other details without departing from the spirit of the invention as defined in the appended claim.

Having thus described our invention, we claim:

In a rail bonding device, the combination with a rail having a cross-section comprising a head, a foot flange and a web connecting the head and flange, a fish plate having a web substantially parallel with and spaced from the web of the rail and portions engaging the head and foot flange of the rail including portions offset laterally toward the rail web and providing vertically spaced longitudinally extending shoulders, and a bolt extending through said webs and securing the rail and fish plate together, of a spring substantially in the form of a single convolution of a helix surrounding said bolt and positioned in the space between said webs, the end portions of said spring being bent axially of the helix and having a greater axial pitch than the body of the spring so that each of said end portions will have a prominent cutting edge thereon, one of said edges being adapted to gouge into the web of the rail and the other into the web of the fish plate when the spring is compressed between said webs, the body of said spring having its periphery in engagement with said shoulder portions of said fish plate on opposite sides of said bolt and the sides of said spring bearing on the web of the rail and the web of the fish plate so that the spring has at least two points of contact with each of said webs to thereby insure good electrical conduction and is confined in the space between the webs, and said spring being so formed that the free axial length is more than three times the thickness, axially of the helix, of the stock of which the spring is made.

WILLIAM V. MOAK.
JASPER THOMAS HAMBLIN.